(12) United States Patent
Merz et al.

(10) Patent No.: US 9,949,607 B2
(45) Date of Patent: Apr. 24, 2018

(54) SELF-PROPELLED SURFACE CLEANING MACHINE AND METHOD FOR OPERATING A SELF-PROPELLED SURFACE CLEANING MACHINE

(71) Applicant: Alfred Kärcher GmbH & Co. KG, Winnenden (DE)

(72) Inventors: Juergen Merz, Waiblingen (DE); Frank Nonnenmann, Schorndorf (DE); Michael Oesterle, Weissach im Tal (DE); Bernd Noller, Bad Schoenborn (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 64 days.

(21) Appl. No.: 14/722,853

(22) Filed: May 27, 2015

(65) Prior Publication Data
US 2015/0257619 A1    Sep. 17, 2015

Related U.S. Application Data

(63) Continuation of application No. PCT/EP2012/073868, filed on Nov. 28, 2012.

(51) Int. Cl.
*A47L 11/28* (2006.01)
*A47L 11/30* (2006.01)
(Continued)

(52) U.S. Cl.
CPC ............ *A47L 11/28* (2013.01); *A47L 11/305* (2013.01); *A47L 11/4061* (2013.01); *A47L 11/4066* (2013.01); *B60L 1/003* (2013.01); *B60L 11/1803* (2013.01); *B60L 15/2036* (2013.01); *B62D 9/00* (2013.01); *B62D 11/10* (2013.01); *B62D 61/08* (2013.01); *B60L 2200/40* (2013.01); *B60L 2220/42* (2013.01); *B60L 2220/44* (2013.01); *B60L 2220/46* (2013.01); *B60L 2240/12* (2013.01); *B60L 2240/24* (2013.01); *B60L 2240/421* (2013.01); *B60L 2240/461* (2013.01); *B60L 2250/26* (2013.01);
(Continued)

(58) Field of Classification Search
None
See application file for complete search history.

(56) References Cited

U.S. PATENT DOCUMENTS 4,103,566 A    8/1978  Hauser et al.
4,334,719 A    6/1982  von Kaler et al.
(Continued)

FOREIGN PATENT DOCUMENTS

DE    30 43 004    5/1982
EP    0 792 615    9/1997
FR    2 573 976    6/1986

*Primary Examiner* — Spencer E Bell
(74) *Attorney, Agent, or Firm* — Womble Bond Dickinson (US) LLP

(57) ABSTRACT

A self-propelled surface cleaning machine is proposed, including a floor cleaning device, a steerable front wheel, a steering device associated with the front wheel, a rear wheel device having at least one left rear wheel and at least one right rear wheel, a first drive device for driving the front wheel, a second drive device for driving the rear wheel device and a differential device for the rear wheel device that allows different speeds of rotation for the at least one left rear wheel and the at least one right rear wheel.

23 Claims, 4 Drawing Sheets

(51) Int. Cl.

| | | |
|---|---|---|
| A47L 11/40 | (2006.01) | |
| B62D 61/08 | (2006.01) | |
| B62D 9/00 | (2006.01) | |
| B62D 11/10 | (2006.01) | |
| B60L 1/00 | (2006.01) | |
| B60L 11/18 | (2006.01) | |
| B60L 15/20 | (2006.01) | |

(52) U.S. Cl.
CPC .......... *B60L 2260/28* (2013.01); *Y02T 10/645* (2013.01); *Y02T 10/648* (2013.01); *Y02T 10/7005* (2013.01); *Y02T 10/7275* (2013.01)

(56) References Cited

U.S. PATENT DOCUMENTS

| | | |
|---|---|---|
| 4,803,753 A | 2/1989 | Palmer |
| 4,825,500 A | 5/1989 | Basham et al. |
| 5,386,742 A | 2/1995 | Irikura et al. |
| 5,487,438 A | 1/1996 | Kinoshita |
| 5,611,106 A * | 3/1997 | Wulff ..................... A47L 11/34 15/320 |
| 7,041,029 B2 | 5/2006 | Fulghum et al. |
| 2005/0239594 A1 * | 10/2005 | Fulghum .............. B62D 11/003 477/1 |
| 2014/0090664 A1 | 4/2014 | Walz et al. |

* cited by examiner

SELF-PROPELLED SURFACE CLEANING MACHINE AND METHOD FOR OPERATING A SELF-PROPELLED SURFACE CLEANING MACHINE

CROSS-REFERENCE TO RELATED APPLICATIONS

This application is a continuation of international application number PCT/EP2012/073868 filed on Nov. 28, 2012, which is incorporated herein by reference in its entirety and for all purposes.

BACKGROUND OF THE INVENTION

The invention relates to a self-propelled (self-driven) surface cleaning machine, comprising a floor (ground) cleaning device, a steerable front wheel, a steering device associated with the front wheel and a rear wheel device having at least one left rear wheel and at least one right rear wheel.

The invention further relates to a method for operating a surface cleaning machine.

PCT/EP2011/059681, not pre-published, filed on 10 Jun. 2011 discloses a self-propelled surface cleaning machine, comprising a front wheel device, a steering device associated with the front wheel device, a steering angle sensor device by which a steering angle at the front wheel device is capable of being detected, a rear wheel device having at least one left rear wheel and at least one right rear wheel, a first electromotive drive device associated with the at least one left rear wheel, a second electromotive drive device associated with the at least one right rear wheel, a cleaning liquid application device by which cleaning liquid is capable of being applied to a floor in an application area that is arranged between the front wheel device and the rear wheel device, and a control device operatively connected for signal communication with the steering angle sensor device, the first electromotive drive device and the second electromotive drive device, wherein each of the first electromotive drive device and the second electromotive drive device is controllable individually depending on signals from the steering angle sensor device.

DE 30 43 004 A1 discloses an electric three-phase current drive for multi-axle vehicles, in particular for vehicles of track-bound, rail-less road traffic, in which the wheel sets are driven by a plurality of three-phase current motors connected to a controllable converter and which provides for compensation of the rotational speeds of the driven wheels when cornering. The wheel sets have individual-wheel drive.

EP 0 398 393 B1 discloses a drive control for a scrubber apparatus operable by an operator for floor maintenance, comprising a motor drive device arranged to drive the scrubbing disks, a squeegee and a device for raising the squeegee, a vacuum fan and a device for shutting off the vacuum fan, a scrub water supply and a device for shutting off the scrub water supply, operating controls for generating electrical signals corresponding to forward, reverse and neutral movement of the scrubber apparatus and a device for translating the signals into motor drive signals. The device for raising the squeegee is connected to and responsive to the signal corresponding to reverse movement of the scrubber apparatus. The device for shutting off the scrub water supply is connected to and responsive to the signal corresponding to a neutral condition of the scrubber apparatus.

U.S. Pat. No. 5,487,438 discloses a drive system for an electric vehicle having a left wheel and a right wheel.

SUMMARY OF THE INVENTION

In accordance with an embodiment of the invention a self-propelled surface cleaning machine is provided that has high driving safety together with high maneuverability.

In accordance with an embodiment of the invention, the self-propelled surface cleaning machine comprises:
- a floor cleaning device;
- a steerable front wheel;
- a steering device associated with the front wheel;
- a rear wheel device having at least one left rear wheel and at least one right rear wheel;
- a first drive device for driving the front wheel;
- a second drive device for driving the rear wheel device; and
- a differential device for the rear wheel device that allows different speeds of rotation for the at least one left rear wheel and the at least one right rear wheel.

In accordance with an embodiment of the invention, both the front wheel and the rear wheel device including the at least one left rear wheel and the at least one right rear wheel are driven. It is thereby possible to accomplish high driving velocities together with high driving safety. The self-propelled surface cleaning machine has high traction together with high climbing ability. By way of example, this makes it possible for the surface cleaning machine to be also used as a towing vehicle or as a pushing vehicle.

The differential device at the rear wheel device allows different rotational speeds to be achieved for the at least one left rear wheel and the at least one right rear wheel. It is thereby possible to achieve high agility and maneuverability of the surface cleaning machine. The differential device allows for different velocities at the rear wheel device.

The first drive device and the second drive device result in a wide range of control options in order to obtain favourable driving characteristics (with respect to agility and maneuverability, velocity, climbing ability etc.) for existing driving parameters.

It is advantageous for the first drive device to comprise a wheel motor and to comprise in particular a wheel hub motor. It is thereby possible for the front wheel to be driven directly and the expense for a gear, for example, is minimized.

It is then advantageous if, in a steering, pivoting motion of the front wheel, the first drive device is co-pivoted therewith. It is thereby possible to eliminate the need for a gear which transmits to the front wheel a drive torque of for example a motor arranged in fixed relation to the body.

It is advantageous for the first drive device to comprise an electric motor. This provides a simple way of realizing an emission-free surface cleaning machine.

Advantageously, the second drive device comprises a common drive for the at least one left rear wheel and the at least one right rear wheel. The number of motors needed can thereby be reduced. The differential device then still permits different rotational speeds or path velocities for the at least one left rear wheel and the at least one right rear wheel, despite the common drive.

It is advantageous for the second drive device to comprise an electric motor. It is thereby possible for an emission-free surface cleaning machine to be realized that is also suitable for use in closed locations.

In an embodiment, the differential device is an axle differential device. It allows different speeds of rotation for the left rear wheel and the right rear wheel. High agility and maneuverability are thereby achieved for the surface cleaning machine.

In particular, the differential device is or comprises a mechanical differential gear. This makes it possible for example to use a common motor for the at least one left rear wheel and the at least one right rear wheel, while it is still possible to provide different speeds of rotation for the at least one left rear wheel and the at least one right rear wheel.

It is particularly advantageous for a control device to be provided which is operatively connected for signal communication with a steering angle sensor device, the first drive device and the second drive device, wherein the control device controls, and in particular individually controls, the first drive device and the second drive device depending on signals from the steering angle sensor device. It is thereby possible to adjust optimum driving conditions for particular steering angles (preset by an operator). For example, the maximum driving velocity is limited depending on a detected steering angle so that cornering too fast can be avoided.

It is advantageous for a sensor device for detecting a velocity presetting to be provided, said sensor device being operatively connected for signal communication with the control device, in particular wherein the control device controls, and in particular individually controls, the first drive device and the second drive device depending on signals from the steering angle sensor device and the sensor device for detecting a velocity presetting. In the control, the velocity presetting is then detected in addition to the steering angle. The velocity presetting need not necessarily correspond to the actual velocity caused by the control device. By way of example, if it is detected that the velocity presetting is too high for the preset steering angle, then the maximum velocity is limited.

The sensor device for detecting a velocity presetting is in particular a sensor device for detecting a position of one or more actuating elements. One actuating element is for example an accelerator pedal for velocity presetting. By way of example, the position of the brake pedal can also be taken into account.

In an exemplary embodiment, the control device comprises a first operational mode which blocks the second drive device at a steering angle of about 90° or close to 90° (for example with a deviation of +/−5° from 90°) relative to a straight ahead travel position of the front wheel. At such a steering angle, drive to the rear wheel device will cease. By way of the blocking action, different speeds of rotation are realized at the rear wheel device. It is thereby possible that, when cornering, the outside rear wheel and the inside rear wheel have opposite speeds of rotation. A high level of maneuverability is realized.

In particular, when in the first operational mode, the at least one left rear wheel and the at least one right rear wheel then have rotational speeds of different signs in order to achieve a high level of agility.

Furthermore, the control device can comprise a second operational mode in which the front wheel, the at least one left rear wheel and the at least one right rear wheel have the same velocity. High climbing ability of the surface cleaning machine can thereby be realized, for example.

In particular, the surface cleaning machine has a middle plane with respect to which the at least one left rear wheel and the at least one right rear wheel have mirror symmetry and at which is positioned the front wheel, in particular in parallel relationship, in the straight ahead travel position thereof. It is thereby possible for a three-wheeled surface cleaning machine to be realized that has high agility.

In particular, a pivot point of the surface cleaning machine is located at a middle point of an axis of the rear wheel device when cornering. In this way, a high level of agility can be realized. This results in optimized floor (ground) cleaning capabilities.

In an embodiment, provision is made for at least one trailer coupling to be present on the surface cleaning machine, said trailer coupling being in particular arranged at a body. By driving the front wheel and the rear wheel device, it is in principle possible for the surface cleaning machine to be utilized as a towing machine or as a pushing machine. The at least one trailer coupling allows trailers to be coupled. By way of example, it is thereby possible for the surface cleaning machine to be used to realize a transport system, wherein a transport operation using the surface cleaning machine as a towing or pushing machine can be accomplished simultaneously with a floor (ground) cleaning operation.

In particular, the surface cleaning machine is configured as a scrubbing machine or as a scrubber vacuum machine or as a sweeping machine.

Provision may be made for the floor cleaning device to comprise one or more scrubbing elements which are in particular rotatable. It is advantageous for these scrubbing elements to be arranged between the front wheel and the rear wheel device. This results in a construction of the surface cleaning machine that is simple in structure and yet can provide optimized cleaning results.

It is further advantageous for the surface cleaning machine to comprise an application device for cleaning liquid via which a cleaning liquid is capable of being applied to a floor. This allows for effective cleaning of smooth surfaces.

Advantageously, the application area is located between the front wheel and the rear wheel device. In this way, the front wheel can ride in "dry area".

In accordance with an embodiment of the invention, a method for operating a self-propelled surface cleaning machine is provided, said method resulting in a wide range of applications for the surface cleaning machine.

In accordance with an embodiment of the invention, a steered front wheel is driven by a first drive device and a rear wheel device having at least one left rear wheel and at least one right rear wheel is driven by a second drive device, wherein the rear wheel device has associated with it a differential device for the at least one left rear wheel and the at least one right rear wheel by way of which the at least one left rear wheel and the at least one right rear wheel can have different speeds of rotation.

The method in accordance with the invention has the advantages that have already been explained in conjunction with the surface cleaning machine constructed in accordance with the invention.

Further advantageous embodiments of the method in accordance with the invention have likewise already been explained in conjunction with the surface cleaning machine constructed in accordance with the invention.

In particular, control of the first drive device for the front wheel and of the second drive device for the rear wheel device is realized depending on a detected steering angle for the front wheel. This results in optimized driving safety; for example, it provides a simple way of accomplishing velocity limitation when cornering.

In particular, control is also realized depending on a detected velocity presetting preset by an operator by, for example, a foot pedal (accelerator pedal) and/or a brake pedal.

A simple construction is obtained if the differential device comprises a mechanical axle differential. By way of example, it is thereby possible to provide a common motor for both the at least one left rear wheel and the at least one right rear wheel.

In an embodiment, when the steering angle of 90° or close to 90° relative to a straight ahead travel position is detected, drive to the rear wheel device is blocked and a rotational speed of the at least one left rear wheel and a rotational speed of the at least one right rear wheel can occur with different signs. This results in optimized cornering capabilities and in particular results in high agility and maneuverability.

The following description of preferred embodiments serves to explain the invention in greater detail in conjunction with the drawings.

DETAILED DESCRIPTION OF THE INVENTION

Figure 1:
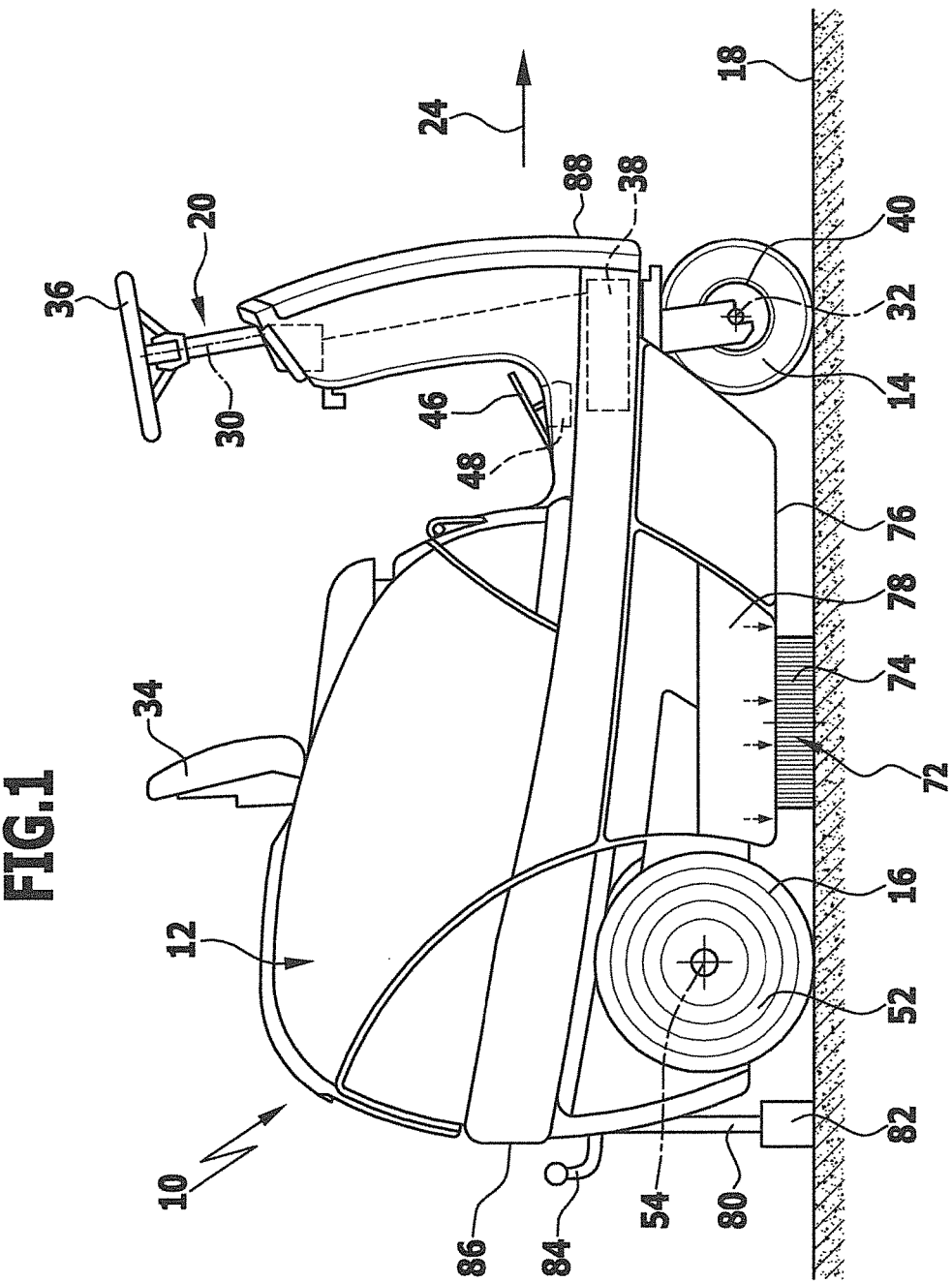
FIG. 1 is a schematic side view of an exemplary embodiment of a surface cleaning machine constructed in accordance with the invention.
Figure 2:
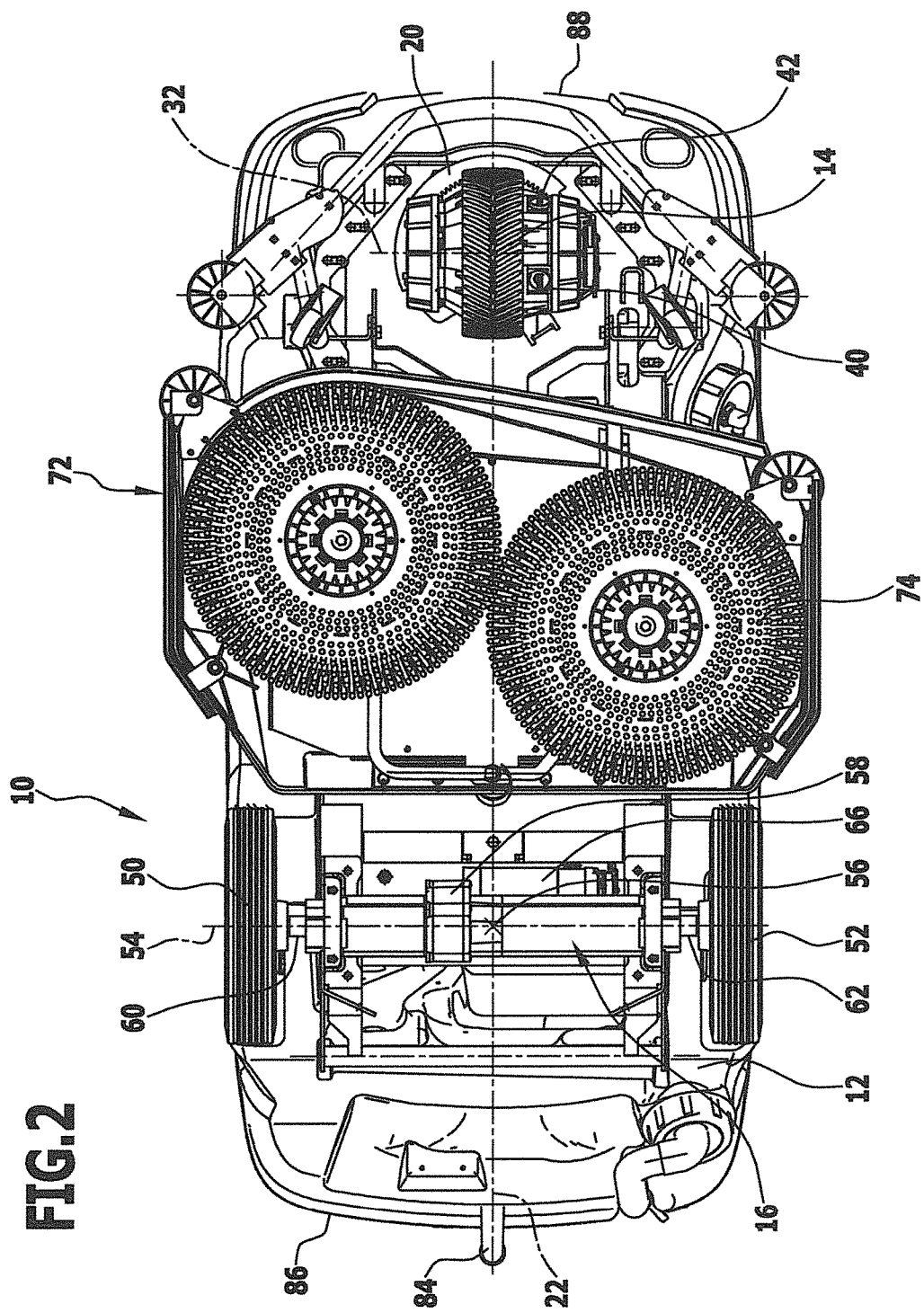
FIG. 2 is a bottom view of the surface cleaning machine in accordance with FIG. 1.

An exemplary embodiment of a self-propelled surface cleaning machine constructed in accordance with the invention, shown in FIG. 1 and designated therein by the reference numeral 10, is attendant-controlled. The surface cleaning machine 10 has a body 12. Mounted to the body 12 are a front wheel 14 and a rear wheel device 16. Via the front wheel 14 and the rear wheel device 16, the surface cleaning machine 10 can drive on a floor 18 that is to be cleaned.

The front wheel 14 is connected to a steering device designated generally at 20. By way of the steering device 20, an angular position of the front wheel 14 with respect to a middle plane 22 (FIG. 3) of the surface cleaning machine 10 can be adjusted. In straight ahead travel (indicated by the reference numeral 24 in FIGS. 1 and 3), the front wheel 14 is oriented parallel to the middle plane 22 and a corresponding steering angle is a zero angle.

Straight ahead travel 24 comprises forward travel and reverse travel. Forward travel is indicated by the reference numeral 26 in FIG. 3 and reverse travel is indicated by the reference numeral 28.

The steering device 20 defines a steering axis 30. Preferably, said steering axis 30 lies in the middle plane 22. The steering axis 30 is oriented transversely and for example perpendicularly to a wheel axis 32 of the front wheel 14. The front wheel 14 is capable of rotating about the wheel axis 32 which is transverse to the middle plane 22. When travelling straight ahead in the straight ahead travel direction 24, the wheel axis 32 is oriented perpendicularly to the middle plane 22.

Arranged on the body 12 is a seat 34 for a driver. A driver sitting on the seat 34 can operate a steering wheel 36 of the steering device 20.

The surface cleaning machine 10 comprises a steering angle sensor device 38. Said steering angle sensor device 38 enables a steering angle at the front wheel 14 and in particular an angular position of the front wheel 14 relative to the middle plane 22 to be detected.

By way of example, the steering device 20 comprises a mechanical steering rod which connects the front wheel 14 and the steering wheel 36. In particular, the sensor device 38 then senses an angular position of the steering wheel 36 or of the steering rod.

Alternatively, it is for example also possible for the steering device 20 to comprise steering rods with a gear interposed therebetween. One steering rod is connected to the steering wheel 36 and another steering rod is connected to the front wheel 14. A gear interposed therebetween provides for rotational angle reduction or rotational angle increase. It is also possible for the gear to be connected to the steering wheel 36 directly or to be connected to the front wheel 14 directly.

It is, for example, also possible for the steering device 20 to comprise a steering motor, and a steering position of the front wheel 14 is then motor-controlled.

The front wheel 14 has a first drive device 40 associated with it which drives the front wheel 14 in its rotational motion in a controlled manner. The first drive device 40 comprises a wheel hub motor 42. The wheel hub motor 42 is in particular an electric motor.

In a steering movement of the front wheel 14, the wheel hub motor 42 co-moves therewith.

The first drive device 40 for the front wheel 14 is controlled by a control device 44. The steering angle sensor device 38 sends its signals for the detected steering angle to the control device 44 and to this end, these components are operatively connected together for signal communication.

In one embodiment, the surface cleaning machine 10 comprises an accelerator pedal 46 and a brake pedal as an actuating element. By actuating (in particular by foot-actuating) said accelerator pedal 46 and possibly the brake pedal, a user presets the velocity of the surface cleaning machine 10. As will be discussed in more detail below, the velocity presetting need not necessarily correspond to the actual target speed; for example, provision may be made that when too high a velocity is preset for a particular steering angle position, the control device 44 provides for velocity limitation ("upper limit speed regulation").

To this end, a sensor device 48 (FIGS. 1 and 3) is provided which detects a velocity presetting by the operator. In the exemplary embodiment depicted in FIG. 1, the sensor device 48 detects a position of the accelerator pedal 46 and of the brake pedal. The sensor device 48 is operatively connected for signal communication with the control device 44 and provides its signals thereto.

The rear wheel device 16 comprises (at least) one left rear wheel 50 and (at least) one right rear wheel 52. Here, the terms "left" and "right" refer to the forward travel direction 26 in straight ahead travel 24.

The left rear wheel 50 and the right rear wheel 52 are capable of rotating about a common wheel axis 54. The wheel axis 54 is fixed relative to the middle plane 22 and is perpendicular thereto; the rear wheel device 16 is unsteered.

In principle, the rear wheel device 16 can be of multi-axle configuration. In the exemplary embodiment shown, the rear wheel device 16 is a single-axle configuration. The surface cleaning machine 10 is then three-wheeled.

In cornering, a pivot point 56 (the piercing point of the axis of rotation) of the surface cleaning machine 10 as a whole is located at a middle point 56 of the wheel axis 54, on the middle plane 22.

The rear wheel device 16 has a differential device 58 associated with it. Said differential device 58 permits different speeds of rotation for the left rear wheel 50 and the right rear wheel 52. To this end, the left rear wheel 50 is mounted on a first shaft 60 and the right rear wheel 52 is mounted on a second shaft 62, for example. The first shaft 60 and the second shaft 62 are coupled to an axle differential gear 64.

The rear wheel device 16 has a second drive device 66 associated with it which drives the rear wheel device 16, and thus the left rear wheel 50 and the right rear wheel 52, in rotation about the wheel axis 54. As mentioned above, the differential device 58 permits different speeds of rotation for the left rear wheel 50 and the right rear wheel 52.

In an exemplary embodiment, the second drive device 66 comprises a common motor 68 for the left rear wheel 50 and the right rear wheel 52. The combination of second drive device 66 and differential device 58 then forms a differential motor.

The second drive device 66 is operatively coupled for signal communication with the control device 44, which controls the second drive device 66.

In particular, the second drive device 66 comprises an electric motor. In the exemplary embodiment, electric motors are provided for the first drive device 40 and the second drive device 66. The surface cleaning machine 10 then comprises a battery device for supplying energy to the electric motors, said battery device being in particular rechargeable.

The electric motors may be ones in which the rotational speeds thereof are fixed by presetting an electric voltage, as in electric motors having permanent magnet rotors. The control device 44 can then preset the rotational speeds at the first drive device 40 and the second drive device 66 by corresponding control commands.

Figure 3:
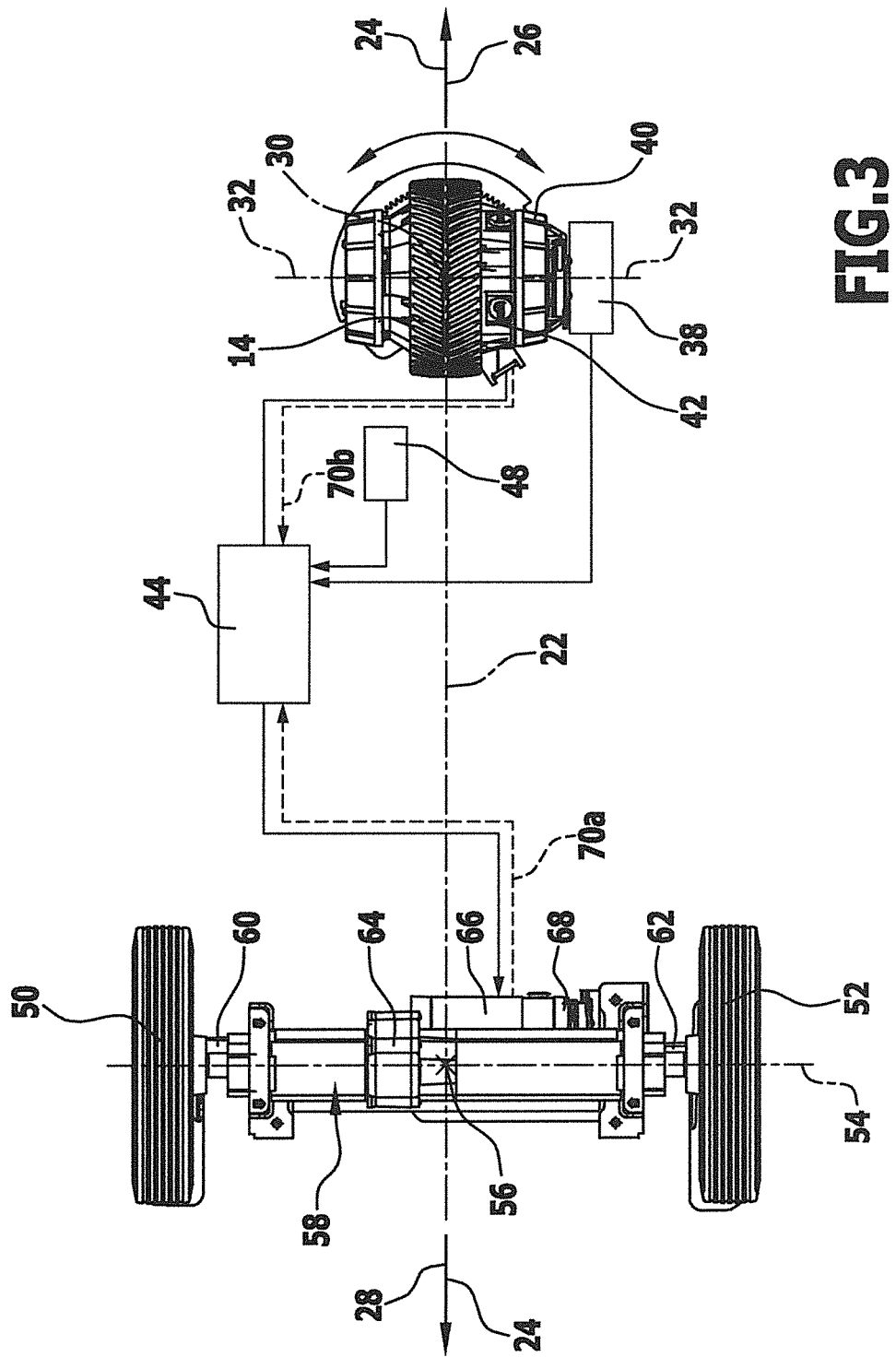
FIG. 3 is a schematic representation of the drive unit of the surface cleaning machine in accordance with FIG. 1.

Other types of motors, such as motors of the asynchronous type, may also be employed. In this case, corresponding sensors at the drive devices detect the actual speeds of rotation and transmit these to the control device 44. Such an embodiment is indicated in FIG. 3 by signal lines 70a, 70b represented by broken lines.

In the surface cleaning machine 10, both the front wheel 14 and the rear wheel device 16 including the left rear wheel 50 and the right rear wheel 52 are driven. Depending on a detected steering position (detected by the steering angle sensor device 38) and a velocity presetting (transmitted via the sensor device 48), the control device 44 provides for an adjustment of the velocities of the front wheel 14 and the left rear wheel 50 and the right rear wheel 52, wherein again, through the action of the differential device 58, different velocities may be present at the left rear wheel 50 and the right rear wheel 52 of the rear wheel device 16. This will be explained in more detail hereinafter.

In an exemplary embodiment, the surface cleaning machine 10 is configured as a scrubbing machine and is configured in particular as a scrubber vacuum machine. It comprises a floor cleaning device 72 which in the exemplary embodiment of the scrubbing machine or scrubber vacuum machine is a scrubbing type floor cleaning device. It has scrubbing elements 74 which are arranged on an underside 76 of the body 12. A scrubbing element 74 is arranged, for example rotatably, between the rear wheel device 16 and the front wheel 14 in facing relation to the floor 18 on which the surface cleaning machine 10 stands.

The floor cleaning device 72 further comprises an application device 78 for cleaning liquid via which cleaning liquid is capable of being applied in an application area to the floor 18 to be cleaned. The cleaning liquid is for example a mixture of water and added chemical. The application device 78 comprises a plurality of nozzles through which the cleaning liquid is capable of being applied to the application area. The nozzles can be arranged in one or more rows.

The nozzles are arranged and configured such that spray is applied directly to the one or more scrubbing elements 74, which are cleaning tools, or cleaning liquid gets to the floor 18 from there, and/or such that spray is applied directly to the floor 18.

The application area for cleaning liquid from the application device 78 is located between the front wheel 14 and the rear wheel device 16. The result is that in cleaning travel, the front wheel 14 does not travel in an area that has cleaning liquid applied thereto, i.e. it rides in dry area, while the rear wheel device 16 travel across the area of the floor 18 that has cleaning liquid applied thereto, i.e. rides in wet area.

A tank for cleaning liquid is arranged at the body 12. The tank can comprise a portion for holding for example water and a portion for holding chemical additives. Via the tank or a mixing portion thereof, the nozzles are supplied with cleaning liquid.

In an exemplary embodiment, the surface cleaning machine 10 comprises a suction device 80 via which excess liquid is capable of being sucked up from the floor 18. To this end a suction bar 82 is provided, for example, which is in contact with the floor 18 when operating in cleaning mode. Said suction bar 82 is arranged rearwardly of the rear wheel device 16 relative to the forward travel direction 26. Liquid is sucked up via said suction bar 82 and is received in a dirty water tank.

A trailer coupling 84 is arranged at the body 12. In the exemplary embodiment shown, a trailer coupling 84 is positioned at a rear end 86 of the surface cleaning machine 10. A trailer can thereby be drawn (when in forward travel 26) or pushed (when in reverse travel 28) by the surface cleaning machine 10. By the trailer coupling 84, the surface cleaning machine 10 can be employed as a towing machine which at the same time performs a floor cleaning operation.

It is also possible for a trailer coupling to be arranged at the body 12 of the surface cleaning machine 10 at a front end 88 thereof. It is thereby possible for the surface cleaning machine 10 to be employed as a pushing machine (in forward travel 26) or as a towing machine (in reverse travel 28).

The self-propelled surface cleaning machine 10 works as follows.

Figure 4:
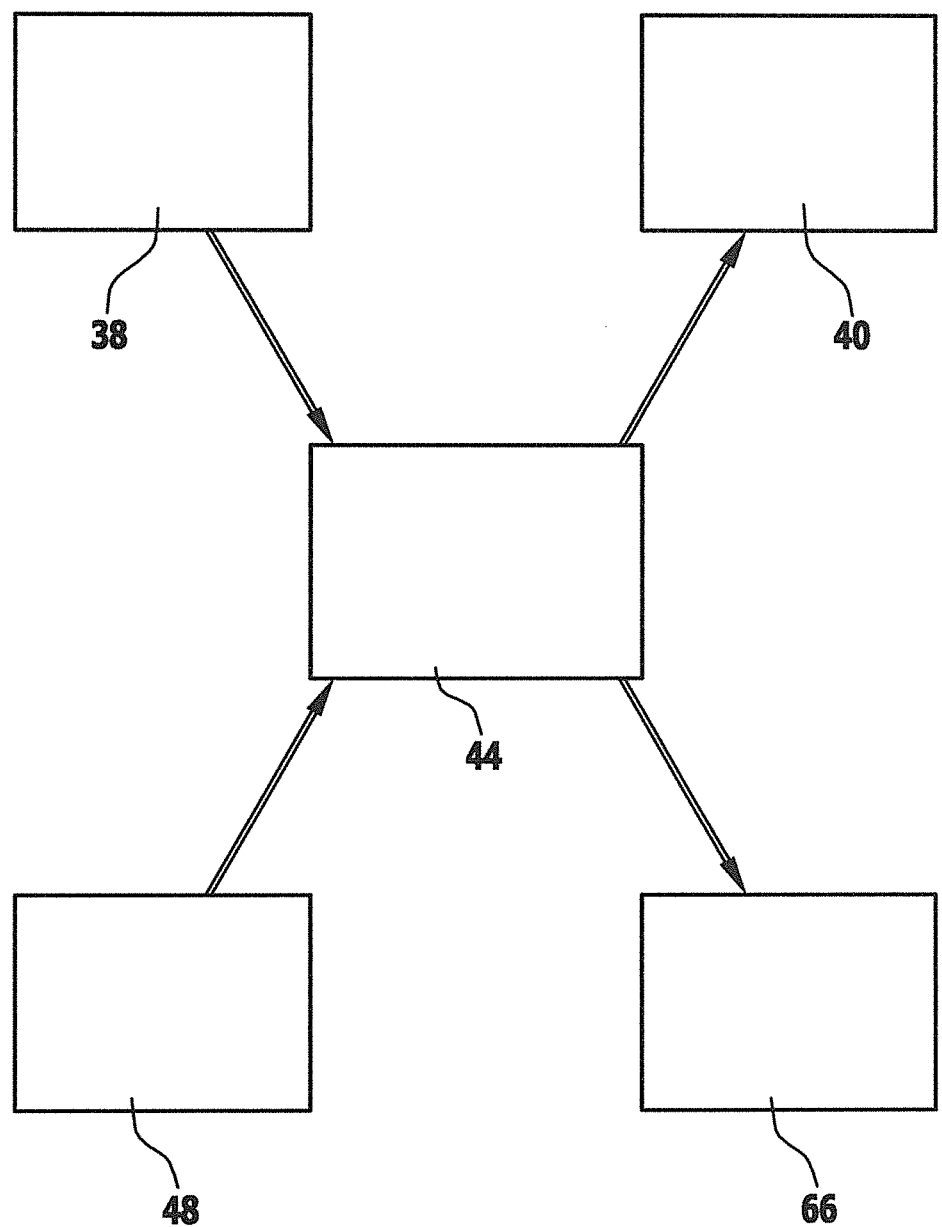
FIG. 4 schematically illustrates a control device, showing controlled components and components that send signals to the control device.

Both the front wheel 14 and the rear wheel device 16 are driven, namely via the first drive device 40 and the second drive device 66 respectively. The control device 44 (compare FIG. 4) controls the first drive device 40 and the second drive device 66. Driving both the front wheel 14 and the rear wheel device 16 results in an improvement of traction and climbing ability and braking ability, together with high maneuverability. For example, it provides the ability to negotiate steep ramps and to accomplish a higher maximum velocity on a level floor 18 together with high driving safety.

The trailer coupling 84 allows the surface cleaning machine 10 to be used as a towing machine. By way of example, it is thereby possible for the surface cleaning machine 10 to be integrated into a production process in which it transports workpieces by one or more trailers, while also being capable of performing floor cleaning.

The control device 44 controls the first drive device 40 and the second drive device 66 depending on signals from the steering angle sensor device 38 and the sensor device 48 for detecting velocity presettings.

By way of example, it is thereby possible to perform velocity limitation depending on a steering angle. For example, if the control device 44 recognizes that for a particular steering angle, as detected via the steering angle sensor device 38, a velocity presetting by an operator (detected via the sensor device 48) is too high, then the control device 44 controls the first drive device 40 and the second drive device 66 correspondingly in order to achieve a limited velocity of the surface cleaning machine 10.

The control device 44 controls the first drive device 40 and the second drive device 66 individually. It is thereby possible to obtain different rotational speeds or path velocities for the front wheel 14 and for the left rear wheel 50 and the right rear wheel 52. In principle, it is thereby possible to improve traction, and a high level of maneuverability is obtained.

In particular, a first operational mode is provided which is at a steering angle of about 90° or close to 90° (with a deviation of +/−5°, for example), where the 90° angle is related to the straight ahead travel direction 24. When such a steering angle is detected (via the steering angle sensor device 38), then the control device 44 sends to the second drive device 66 a blocking signal which blocks the corresponding motor of the second drive device 66. By the differential device 58, the left rear wheel 50 and the right rear wheel 52 are then capable of rotating freely in opposite directions with respect to the wheel axis 54. This makes it possible for a wheel on the outside of the curve to rotate forward and for a wheel at the inside of the curve to rotate backward. This results in maximum agility, wherein in the first operational mode, the driving of the surface cleaning machine 10 as a whole is realized via the first drive device 40 by driving the front wheel 14.

In a second operational mode for forward travel 26 or reverse travel 28, the left rear wheel 50, the right rear wheel 52 and the front wheel 14 are at the same path velocity.

As mentioned above, the control device 44 provides that in cornering, the highest possible velocity is limited, in particular depending on the steering angle, in order to ensure safe driving behaviour.

The differential device 58 makes possible different speeds of rotation for the left rear wheel 50 and the right rear wheel 52. It is thereby possible to achieve high traction which enables differences in floor (ground) situations at the left rear wheel 50 and the right rear wheel 52 to be taken into account.

The differential device 58 allows safe driving behaviour to be achieved when cornering, wherein safe cornering is possible even at a 90° steering angle. This in turn provides for the high level of maneuverability as above mentioned. Using a mechanical differential device 58 affords in particular the possibility of employing a common motor 28 for driving both the left rear wheel 50 and the right rear wheel 52, with the mechanical differential device permitting different speeds of rotation.

The self-propelled surface cleaning machine 10 constructed in accordance with the invention can drive faster, has a higher climbing ability and exhibits enhanced traction. It can be utilized as a towing machine or as a pushing machine.

LIST OF REFERENCE CHARACTERS

10 surface cleaning machine
12 body
14 front wheel
16 rear wheel device
18 floor
20 steering device
22 middle plane
24 straight ahead travel
26 forward travel
28 reverse travel
30 steering axis
32 wheel axis
34 seat
36 steering wheel
38 steering angle sensor device
40 first drive device
42 wheel hub motor
44 control device
46 accelerator pedal
48 sensor device
50 left rear wheel
52 right rear wheel
54 wheel axis
56 middle point
58 differential device
60 first shaft
62 second shaft
64 axle differential gear
66 second drive device
68 motor
70a signal line
70b signal line
72 floor cleaning device
74 scrubbing element
76 underside
78 application device
80 suction device
82 suction bar
84 trailer coupling
86 rear end
88 front end

The invention claimed is:

1. A self-propelled surface cleaning machine, comprising:
a floor cleaning device;
a steerable front wheel;
a steering device associated with the front wheel, said steering device comprising a steering wheel and a mechanical steering rod connecting the front wheel and the steering wheel;
a steering angle sensor device which senses an angular position of the steering wheel or steering rod;
a rear wheel device having at least one left rear wheel and at least one right rear wheel;
a first drive device for driving the front wheel;
a second drive device for driving the rear wheel device;
a differential device for the rear wheel device that allows different speeds of rotation for the at least one left rear wheel and the at least one right rear wheel; and
a control device which is operatively connected for signal communication with the steering angle sensor device, the first drive device and the second drive device, wherein the control device is configured to control the first drive device and the second drive device depending on signals from the steering angle sensor device;

wherein the control device is configured to operate in a first operational mode which blocks the second drive device at a steering angle of 90°±5° relative to a straight ahead travel position of the front wheel; and wherein the control device is configured to operate in a second operational mode in which the front wheel, the at least one left rear wheel and the at least one right rear wheel have the same velocity.

2. The self-propelled surface cleaning machine in accordance with claim 1, wherein the first drive device comprises a wheel motor.

3. The self-propelled surface cleaning machine in accordance with claim 1, wherein in a steering, pivoting motion of the front wheel, the first drive device is co-pivoted therewith.

4. The self-propelled surface cleaning machine in accordance with claim 1, wherein the first drive device comprises an electric motor.

5. The self-propelled surface cleaning machine in accordance with claim 1, wherein the second drive device comprises a common drive for the at least one left rear wheel and the at least one right rear wheel.

6. The self-propelled surface cleaning machine in accordance with claim 1, wherein the second drive device comprises an electric motor.

7. The self-propelled surface cleaning machine in accordance with claim 1, wherein the differential device is an axle differential device.

8. The self-propelled surface cleaning machine in accordance with claim 1, wherein the differential device comprises a mechanical differential gear.

9. The self-propelled surface cleaning machine in accordance with claim 1, wherein a sensor device for detecting a velocity presetting is provided, said sensor device being operatively connected for signal communication with the control device, wherein the control device controls the first drive device and the second drive device depending on signals from the steering angle sensor device and the sensor device for detecting a velocity presetting.

10. The self-propelled surface cleaning machine in accordance with claim 9, wherein the sensor device for detecting a velocity presetting is a sensor device for detecting a position of one or more actuating elements.

11. The self-propelled surface cleaning machine in accordance with claim 1, wherein, when in the first operational mode, the at least one left rear wheel and the at least one right rear wheel can have rotational speeds of different directions.

12. The self-propelled surface cleaning machine in accordance with claim 1, wherein there is provided a middle plane with respect to which the at least one left rear wheel and the at least one right rear wheel have mirror symmetry and at which is positioned the front wheel when in its straight ahead travel position.

13. The self-propelled surface cleaning machine in accordance with claim 1, wherein a pivot point of the surface cleaning machine is located at a middle point of an axis of the rear wheel device when cornering.

14. The self-propelled surface cleaning machine in accordance with claim 1, wherein there is provided at least one trailer coupling.

15. The self-propelled surface cleaning machine in accordance with claim 1, wherein the self-propelled surface cleaning machine is configured as a scrubbing machine, or as a sweeping machine.

16. The self-propelled surface cleaning machine in accordance with claim 1, wherein the floor cleaning device comprises one or more scrubbing elements which are in particular arranged between the front wheel and the rear wheel device.

17. The self-propelled surface cleaning machine in accordance with claim 1, wherein the floor cleaning device comprises a cleaning liquid application device through which a cleaning liquid is applicable to a floor.

18. The self-propelled surface cleaning machine in accordance with claim 17, wherein an application area is located between the front wheel and the rear wheel device.

19. A method for operating the self-propelled surface cleaning machine of claim 1, comprising:
    driving a steered front wheel by a first drive device; and
    driving a rear wheel device having at least one left rear wheel and at least one right rear wheel by a second drive device;
    wherein the rear wheel device has associated with it a differential device for the at least one left rear wheel and the at least one right rear wheel by way of which the at least one left rear wheel and the at least one right rear wheel can have different speeds of rotation.

20. The method for operating a self-propelled surface cleaning machine in accordance with claim 19, wherein control of the first drive device for the front wheel and of the second drive device for the rear wheel device is realized depending on a detected steering angle for the front wheel.

21. The method for operating a self-propelled surface cleaning machine in accordance with claim 20, wherein control is also realized depending on a detected velocity presetting.

22. The method for operating a self-propelled surface cleaning machine in accordance with claim 19, wherein the differential device comprises a mechanical axle differential.

23. The method for operating a self-propelled surface cleaning machine in accordance with claim 19, wherein at a detected steering angle of 90°±5° relative to a straight ahead travel position, drive to the rear wheel device is blocked and a rotational speed of the at least one left rear wheel and a rotational speed of the at least one right rear wheel can occur with different directions.

* * * * *